United States Patent [19]

Grief

[11] Patent Number: 4,651,869
[45] Date of Patent: Mar. 24, 1987

[54] APPARATUS HAVING A VIBRATORY DRIVE FOR THE FEEDING OF WORKPIECES IN ROWS

[75] Inventor: Norbert Grief, Aachen, Fed. Rep. of Germany

[73] Assignee: Rhein-Nadel Automation GmbH, Aachen, Fed. Rep. of Germany

[21] Appl. No.: 643,526

[22] Filed: Aug. 23, 1984

[30] Foreign Application Priority Data

Aug. 29, 1983 [DE] Fed. Rep. of Germany ....... 3331050

[51] Int. Cl.⁴ .............................................. B65G 25/00
[52] U.S. Cl. ...................................... 198/750; 198/763
[58] Field of Search ................. 198/750, 763, 769, 771

[56] References Cited

U.S. PATENT DOCUMENTS

| | | | |
|---|---|---|---|
| 3,194,392 | 7/1965 | Manderbach | 198/390 X |
| 3,372,793 | 3/1968 | Redford et al. | 198/769 X |
| 4,356,911 | 11/1982 | Brown | 198/766 |

FOREIGN PATENT DOCUMENTS

| | | | |
|---|---|---|---|
| 56-82712 | 7/1981 | Japan | 198/769 |
| 57-67410 | 4/1982 | Japan | 198/769 |
| 843925 | 8/1960 | United Kingdom | 198/763 |

Primary Examiner—Joseph E. Valenza
Assistant Examiner—D. Glenn Dayoan
Attorney, Agent, or Firm—Martin A. Farber

[57] ABSTRACT

An apparatus for ordered feeding of workpieces on a table in a row along a feed path defining a plane and having a longitudinal direction to and from workpiece processing machines and the like having a base, two sets of leaf springs spaced apart from each other in the longitudinal direction of the feed path, each of the sets of leaf springs extending in a plane which is perpendicular to the feed path and is connected at portions adjacent respective ends thereof to the base and the table, respectively, the corresponding portions of each of the sets of leaf springs being alternately connected to the base and to the table; and vibratory drive means for applying forces to the table which are parallel to the feed path, the sets of leaf springs oscillating only in a plane parallel to the feed path and where the drive means imparts a speed of displacement greater than the speed of return of the feed path caused by the sets of leaf springs.

9 Claims, 5 Drawing Figures

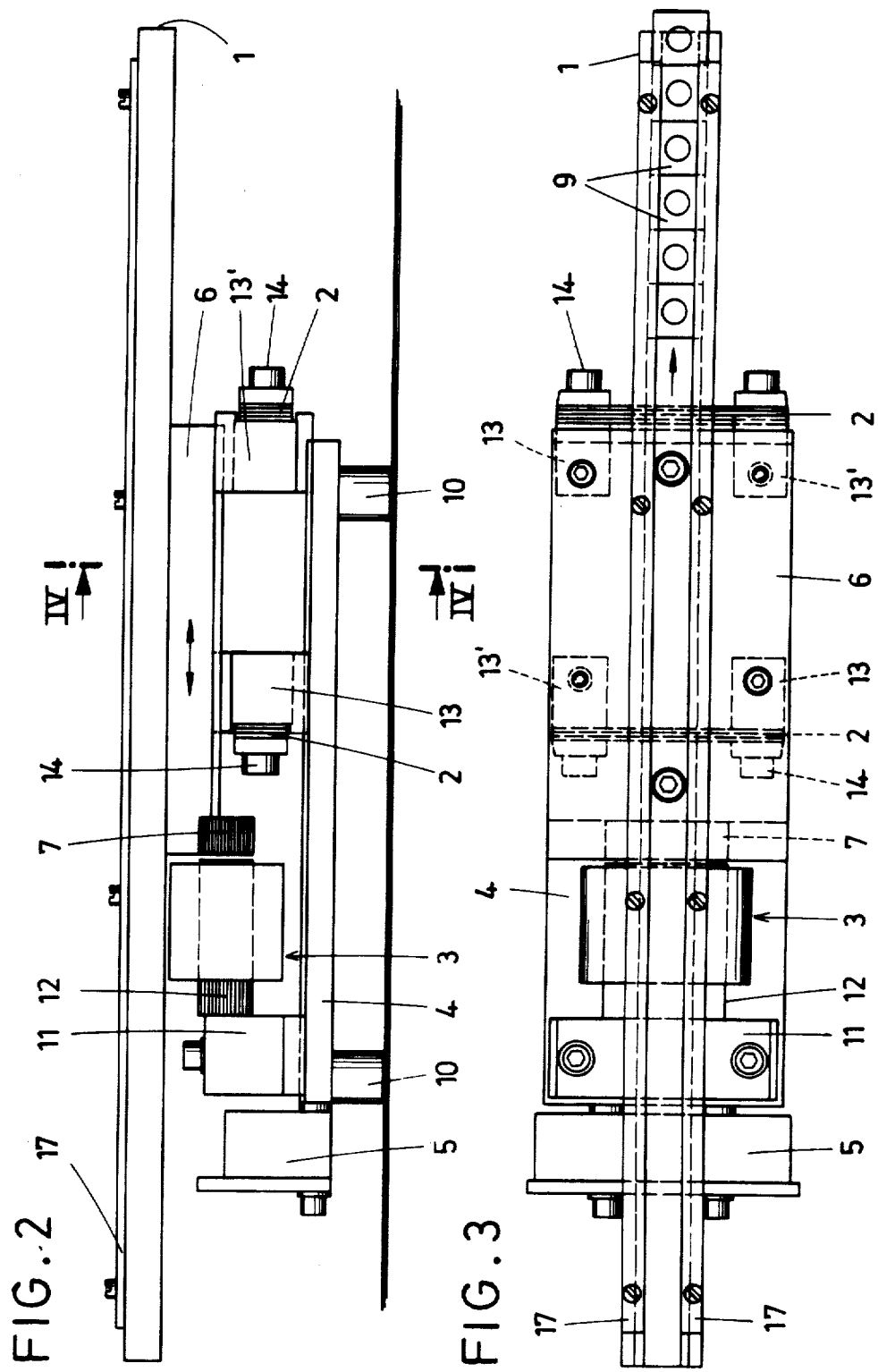

APPARATUS HAVING A VIBRATORY DRIVE FOR THE FEEDING OF WORKPIECES IN ROWS

FIELD AND BACKGROUND OF THE INVENTION

The present invention relates to an apparatus for the ordered feeding of workpieces in rows.

In particular the invention relates to an apparatus for the ordered feeding of workpieces in rows to or from workpiece processing machines or the like, having a vibratory drive for a work feed path which is carried by springs and moved back by them from a displacement position caused by the vibratory drive, the springs extending at one end from an oscillatingly standing base frame which supports the vibratory drive and at the other end being connected to the work feed path.

One apparatus of this type is known from the brochure of AEG-Vibrationstechnik (VIB 1/09/0977). It has two leaf springs inclined in obliquely vertical direction to the direction of workpiece conveyance. One end of said springs is fastened to the base plate and the other end is fastened to the table which bears the work feed path. As a vibratory drive there is employed an electromagnet which is connected by an oscillating armature to the table. The plane of oscillation of the leaf springs is perpendicular to the plane of the work feed path, with the result that all points present on the upper edge of the work feed path move along an arcuate path, resulting in a projectile movement of a part present on the work feed path.

This projectile motion has disadvantages for the transport of, in particular, flat workpieces since one part may land on top of another. Depending on the development of the work feed path, they may tilt, continuous transport may be prevented and, finally, the parts to be transported may be damaged thereby. Furthermore, due to the projectile motion upon the conveyance, a large amount of noise and losses in energy result, since a part of the energy is used for the projecting upward of the workpieces.

The object of the present invention is to develop an apparatus of this type which avoids the aforementioned disadvantages and has a structure which is favorable for manufacture and use, in such a way that the conveying movement takes place, as far as possible, as a pure sliding movement of the workpieces.

SUMMARY OF THE INVENTION

In accordance with the invention this result is obtained in the manner that the plane of the work feed path lies parallel to the plane of oscillation of the springs and that the speed of displacement of the work feed path which results from the vibratory drive is greater than the return speed which results from the springs.

By arrangement of the leaf springs transverse to the direction of movement of the work feed path, the result is obtained that the plane of oscillation of the springs is parallel to the plane of the work feed path. By this arrangement of the leaf springs the result is furthermore obtained that the work feed path, and thus the workpieces to be transported which are present on it, carry out a sliding movement without projectile motion. In this way, tilting, coming on top of one another and non-uniform transport of the workpieces are excluded so that damage to the workpieces is also out of the question. As a result, the apparatus operates with greater efficiency and less noise.

Due to the difference between the two speeds—the speed of displacement determined by the force of attraction of the magnet and the speed of return of the work feed path determined by the restoring force of the springs—continuous movement of the workpiece on the work feed path is assured. Linear development of the work feed path is possible, as well as development of the apparatus as a helicoidal conveyor.

If the speed of displacement resulting from the vibratory drive is greater than the return speed which results from the springs then the best possible accommodation with respect to the speed of conveyance in directions opposite the direction of the spring return movement is obtained via the energy made available to the vibratory drive, and this substantially as a linear function.

One advantageous further development of the invention resides in the fact that the springs are developed as leaf springs which extend in the plane of oscillation and transverse to the work feed path.

Such leaf springs—in contradistinction to compression springs which would have to be suitably guided—need be fastened only via the spring abutments to the base plate on the one side and to the table bearing the work feed path on the other side. The leaf springs furthermore make a compact construction possible, since while having small dimensions they have the force and stiffness desired for maintaining their position in height. Furthermore, separate guidance for the table bearing the work feed path is unnecessary since the leaf springs fulfill a two-fold function in that, on the one hand, they support the table and, on the other hand, they transmit their restoring effect to the table. In this connection it is advantageous for the end of each leaf spring on the base-frame side and the end of each leaf spring on the work-feed-path side to lie alternately on opposite sides of the work feed path. This results in a linear oscillation of the work feed path and thus prevents tilting of the parts being conveyed.

A recoil abutment weight is present on the base frame on the side facing away from the direction of conveyance of workpieces. This recoil abutment weight intercepts the recoil forces transmitted to the base plate and provides assurance that the speed of the workpieces present on the work feed path remains constant over its entire length of conveyance. The recoil abutment weight optimizes the oscillatory behavior of the base frame, which frame is mounted for vertical oscillation, for instance on elastic buffers. This also optimizes the clearances which the feed path has on both sides of the vibratory drive. While in the previously known projectile conveyors the oscillatability of the base frame is of importance only for the purpose of reducing of noise, etc., in the case of the object of the invention it produces the possibility of ordered conveyance of workpieces in the conveying movement.

The vibratory drive, which is borne by the base frame, comprises a magnetic drive of an electromagnet and is connected via an oscillating armature to the table bearing the work feed path. This drive constitutes a compact, reliable source which provides the necessary vibratory forces. The arrangement of the oscillating armature on the bottom of the supporting table at the height of the plane of oscillation of the leaf springs leads to a more favorable transmission of forces between the electromagnet and the work feed path.

In one preferred embodiment, the work feed path is developed as a rail having lateral grooves which are gripped around. This guarantees precise guidance of the flat workpieces over the entire length of the work feed path without parts being able to slip off laterally from the work feed path.

BRIEF DESCRIPTION OF THE DRAWINGS

The invention will be described below with reference to an embodiment shown in the drawings, in which:

FIG. 2 is a side view of the apparatus;

FIG. 3 is a top view of the entire apparatus;

DETAILED DESCRIPTION OF THE PREFERRED EMBODIMENT

Figure 1:
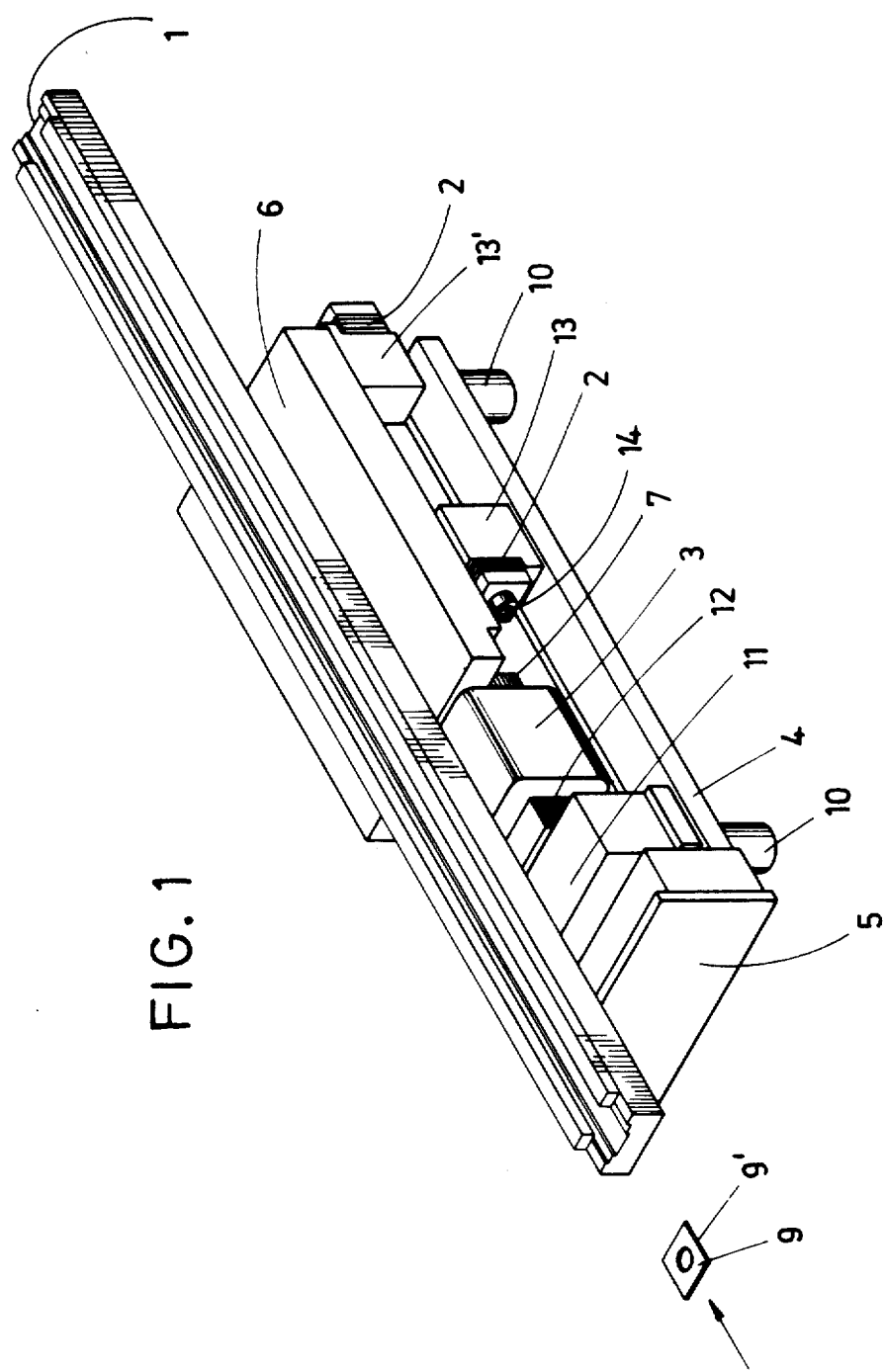
FIG. 1 is a perspective view of the apparatus according to the invention.
Figure 4:
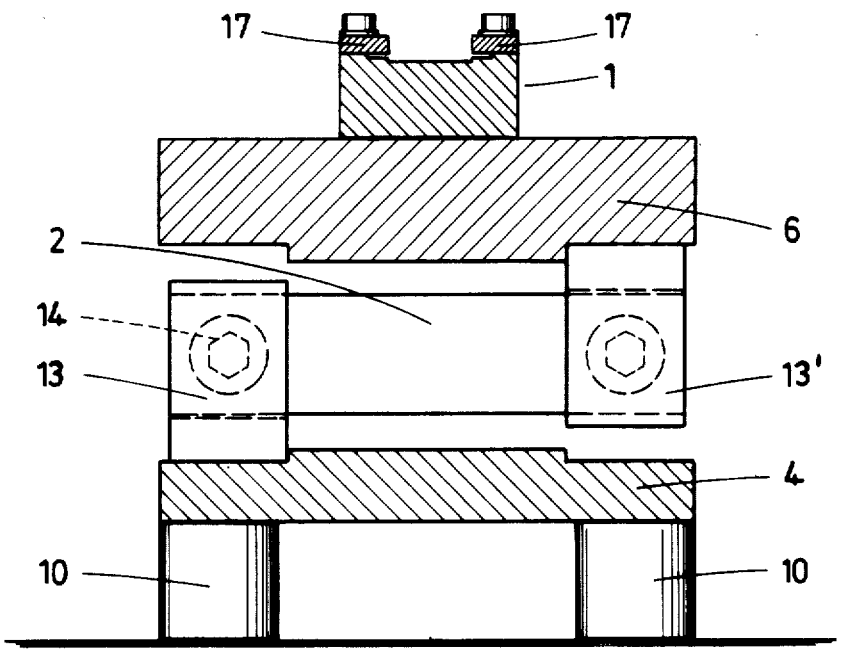
FIG. 4 is a section along the line IV—IV of FIG. 2.

The apparatus shown in FIGS. 1 and 2 consists of a rectangular base plate 4 seated on four elastic buffers 10, a bracket 11 being arranged on one end of said plate in order horizontally to receive a magnet core 12 and thus effect the attachment of electromagnet 3. On the while on its other end of said plate 4 there are arranged two spring abutments 13 which, in their turn, are coupled to a table 6 via respective leaf springs 2 and respective abutments 13'. The table carries a work feed path 1 on its top, preferably centrally, and is operatively connected on its bottom to the vibratory drive, which is developed as electromagnet 3, via an oscillating armature 7 thereof. Armature 7 is located approximately at the height of the spring oscillation plane, the cross-sectional size of which corresponds to that of the magnet core 12.

The leaf springs 2 extend transverse to the work feed path 1, oscillate parallel to it and produce the required restoring force. The springs 2 are carried by the two spring abutments 13 and are connected to them by means of bolts 14. The spring abutments 13, which are arranged in a manner corresponding to the arrangement of the leaf springs transversely to the lengthwise direction of the work feed path, represent a spring connection between the base plate 4 and the table 6. These abutments 13 are connected at one end to the base plate 4 and at the other end, via the respective leaf springs, to the supporting table 6. The table-side points of connection of abutments 13 are formed by spring abutments 13', the latter being fastened the bottom of the table, alternately, on two opposite sides of the work feed path 1.

The work feed path 1 is fixedly connected to the supporting table 6, the work feed path 1 however being adjustable with respect to the bearing table 6 in longitudinal direction.

On the side of the base plate 4 facing away from the direction of conveyance there is a recoil abutment weight 5, developed as a metal block, which is firmly connected to the base plate.

Figure 5:
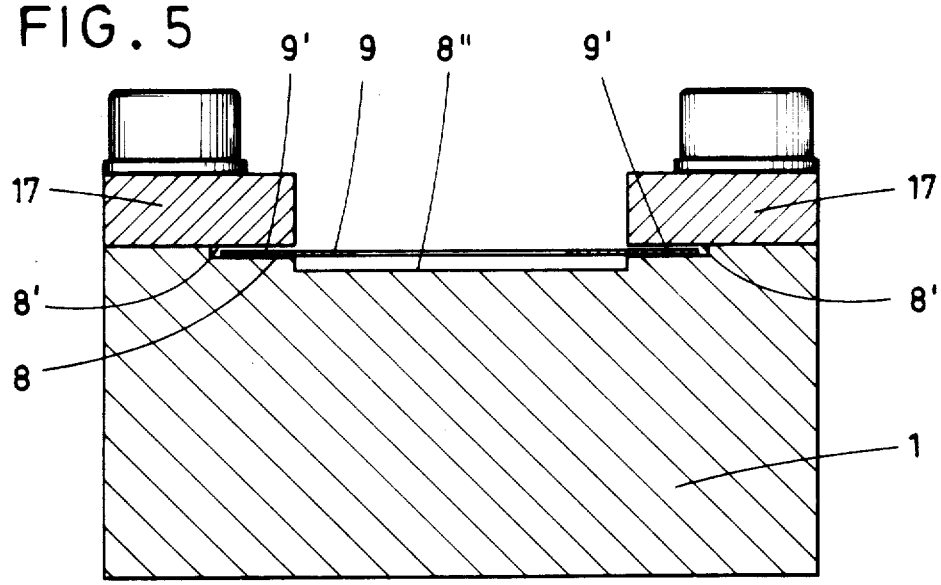
FIG. 5 is a section through the work feed path of FIG. 4, with the work feed path shown in larger size.

The work feed path 1 shown in FIG. 5 is formed with a groove 8 on its upper side, the edges 8' of the groove being covered by two ledges 17 which extend along the work feed path 1 and are connected to it. The groove 8 is of stepped development, having a middle depression 8" so that the workpieces 9 to be conveyed rest on the work feed path 1 only at the edges 9' of the workpiece 9.

I claim:

1. An apparatus for ordered feeding of workpieces on a table in a row along a feed path defined thereon defining a plane and having a longitudinal direction to and respectively from workpiece processing machines and the like, comprising a base, two sets of leaf springs spaced apart from each other in the longitudinal direction of said feed path, each of said sets of leaf springs extends in a plane which is precisely perpendicular to said longitudinal direction and is connected at portions adjacent respective ends thereof to said base and said table, respectively, corresponding of said portions of each of said sets of leaf springs being connected alternately to said base and to said table, and vibratory drive means mounted on said base for applying forces to said table which are only parallel to said longitudinal direction of said feed path for vibratorily moving said feed path in said longitudinal direction of said feed path, said sets of leaf springs oscillating only in a plane of oscillation precisely parallel to said feed path and wherein said drive means imparts a speed of displacement greater than the speed of return of the feed path caused by said sets of leaf springs.

2. The apparatus according to claim 1, further comprising a recoil abutment weight mounted on said base on a side facing away from a direction of conveyance.

3. The apparatus according to claim 1, wherein said vibratory drive means comprises a magnet drive having an electromagnet mounted on the base, and an oscillating armature, said armature is arranged approximately at a height of the plane of oscillation of the sets of leaf springs at a bottom of said table.

4. The apparatus according to claim 1, wherein the feed path comprises a rail having a groove, said groove centrally defining a middle depression and edges of the groove being gripped over for the guided entrance of the workpieces.

5. The apparatus according to claim 2, wherein said vibratory drive means comprises a magnet drive having an electromagnet mounted on the base, and an oscillating armature, said armature is arranged approximately at a height of the plane of oscillation of the sets of leaf springs at a bottom of said table.

6. The apparatus according to claim 1, wherein said base has upwardly extending first abutments connected to corresponding of said portions of said sets of leaf springs, and said table has downwardly extending second abutments connected to said other portions of said sets of leaf springs, and said first and second abutments are disposed in said plane of oscillation.

7. The apparatus according to claim 1, wherein said feed path is adjustably mounted on said table.

8. The apparatus according to claim 1, wherein said portions of said leaf springs are rigidly connected to said base and said table, respectively.

9. The apparatus according to claim 1, wherein said base has elastic buffers supporting said base.